May 18, 1954     H. D. PORTER     2,678,885
PREPARATION OF PHOTOGRAPHIC EMULSIONS
Filed April 8, 1950
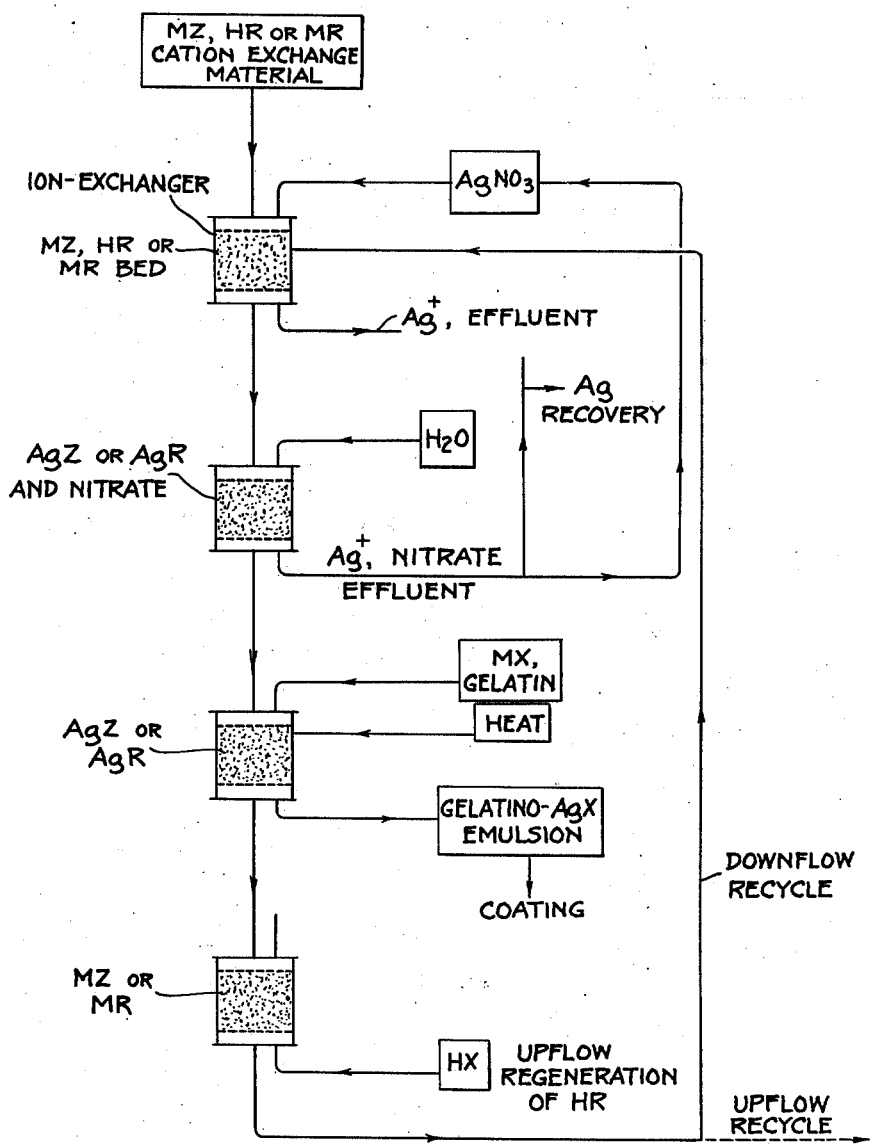
HENRY D. PORTER
*INVENTOR*
BY Daniel J. Mayne
W. H. McDowell
*ATTORNEY & AGENT*

Patented May 18, 1954

2,678,885

UNITED STATES PATENT OFFICE 2,678,885

PREPARATION OF PHOTOGRAPHIC EMULSIONS

Henry D. Porter, Rochester, N. Y., assignor to Eastman Kodak Company, Rochester, N. Y., a corporation of New Jersey Application April 8, 1950, Serial No. 154,802

12 Claims. (Cl. 95—7)

This invention relates to the preparation of photographic emulsions, and more particularly to the preparation of washed types of photographic emulsions, by means of ion exchange materials.

According to the broadest aspects of my invention, photographic emulsions are prepared by converting a cation exchange material to the silver cycle in which the silver derivative is formed and then passing through the exchange material a solution containing essentially a soluble halide and a peptizing agent for silver halide. The peptizing agent is used in part, as is conventional in the art, to aid in dispersing the silver halide and preventing it from agglomerating as it is formed. In addition, the peptizer in the present process serves to prevent the silver halide from clogging the ion exchange bed and allows the emulsion to flow freely from the bed.

Ion exchange materials have previously been used for the removal of soluble halides from aqueous solutions by converting the exchange material to the silver cycle and then passing the salt solution through the silver bed. In such processes, the silver halide thus formed has been removed with solvents such as cyanide solution. However, no method has previously been proposed to remove the silver halide from the exchange bed in a condition that it is suitable for use in sensitive photographic elements.

One object of my invention is to provide methods of using ion exchange materials for forming photographic emulsions. Another object is to provide methods of making emulsions which obviate conventional washing steps. A further object is to provide a method of forming emulsions having diverse properties by means of ion exchange materials. Another object is to provide a method of separating silver halide produced in an ion exchange bed in a form suitable for use as a photographic emulsion. Other objects of my invention will become apparent from consideration of the following description:

In the accompanying drawing is shown in flow diagram form the general procedure for making emulsions by means of an ion exchange bed.

It will be apparent from consideration of the following reactions wherein one advantage of my process lies

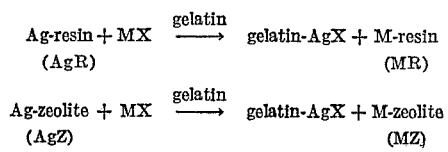

According to the above reactions, the only reaction products are gelatin-silver halide emulsion and the alkali metal form of the resin or zeolite material. Therefore, no soluble salts remain which need be washed out of the emulsion before use. Further, it is a relatively simple procedure to adapt the processes to continuous operation by either reconverting the alkali metal resin or zeolite to the corresponding silver cycle and repeating the process or a bank of exchange units may be used.

The ion exchange materials I can use include both the inorganic and organic materials. Examples of the inorganic type are the well-known natural zeolites (glauconites); and the synthetic zeolites (precipitated sodium aluminum silicates as in U. S. Patent 2,318,753, May 11, 1943); examples of the organic exchange materials are the carbonaceous sulfonated coals, U. S. Patent 2,191,063, February 20, 1940; and the various synthetic organic, cation exchange resins such as the phenolsulfonic acid-phenol-formaldehyde material acid or alkaline condensed, as in U. S. Patent 2,204,539, June 11, 1940; the product of the alkaline condensation of phenol-formaldehyde in the presence of sulfite, U. S. Patent 2,228,159; salicylic acid-penol-formaldehyde, alkaline condensed, U. S. Pat. 2,204,539, June 11, 1940; sulfonated polystyrene, U. S. Patent 2,366,007, December 26, 1944.

The above exchangers are typical cationic exchange materials undergoing double decomposition with alkali and alkaline earth metals. As is apparent, the alkali metal cycles of these materials can also be converted to the corresponding silver cycles, and back to the alkali metal cycle with alkali metal salts. When it is desired to use one of these exchange materials in the hydrogen cycle, the material in the alkali metal form is treated with acid such as hydrochloric or sulfuric acids.

My invention will be understood by a consideration of the following description and the examples by reference to the accompanying drawing.

As shown in the first stage of the drawing, the exchange material which is either for example an alkali metal zeolite (MZ), a sulfonated resin in the H cycle (HR) or a sulfonated resin in the alkali metal cycle (MR), or mixtures thereof, is introduced into the ion exchanger which may be any vessel provided with some means for introducing the reactants and drawing off effluents and product, preferably a column or tank provided with inlets and outlets. Perforated plates or porous layers are above and below the exchange bed serving to confine the exchange material to the container in both upflow and downflow operations.

After introduction of the material into the exchanger, it is converted by downflow as shown in the first stage of the drawings to the silver cycle by introducing an aqueous solution of a water-soluble silver salt such as silver nitrate until silver ion is detected in the effluent. Washing with water then follows until the loss of acid and silver ion has reached a constant rate. In this step shown in the second stage of the drawings, excess silver salt and nitrate are removed from the bed leaving AgZ or AgR in the bed as the case may be. The first part of the effluent from this operation can be used to prepare the next batch of silver nitrate solution, and the remainder combined with the effluent from the previous step and sent to a silver recovery unit.

In order to produce silver halide emulsion in the exchanger as shown in the third stage of the drawings, a water-soluble halide such as hydrogen, alkali metal, alkaline earth or ammonium halide solution (MX), for example, sodium bromide, sodium chloride, ammonium chloride, calcium chloride, etc., or a mixture of halides is run into the exchanger in the presence of a peptizing agent for silver halide, such as gelatin, modified proteins, gelatin derivatives or acrylamide resins disclosed in the Lowe et al. U. S. applications Ser. Nos. 768,478 and 768,480, filed August 13, 1947, and 685,375, filed July 22, 1946. This can be carried out in various ways; for example, a gelatin solution may first be passed through the bed followed by the salt solution or a single solution of a mixture of gelatin and the salt may be employed. If desired, silver halide can be first formed in the column where it is adsorbed on the exchange material and then it can be peptized off the exchange material by passing as a dispersion a solution of gelatin or other silver halide-peptizing material through the bed. It is preferable to supply heat to the reaction to control the emulsion characteristics. This is accomplished by supplying heat through the jacket of the exchanger and using warm solutions of the reactants. The result of precipitating the silver halide in the presence of the silver halide peptizing agent is to disperse the silver halide in a finely divided state in the regenerated exchange bed and in this form it flows freely from the exchanger as a gelatino-silver halide emulsion. The emulsion may then be digested, ripened, and sensitizers and other addenda added as is customary in the art following which the emulsion is coated on the usual photographic support.

The result of forming the silver halide emulsion in the exchanger as described, is to convert the cation exchange material back to the alkali or other metal cycle (MZ or MR) depending on the metal halide used as shown in the fourth stage of the drawings. The exchange bed can then be again converted to the silver cycle as before and more emulsion produced in a downflow recycle or, if desired, by an upflow recycle. Alternately, if preferred to use the hydrogen cycle of the exchange material, the MR bed can be regenerated to the hydrogen cycle with acid solution as shown in the drawings. Economies of my method can be appreciated when it is realized that in re-cycling, I can utilize the silver salt of the effluent of the washing step for re-converting the exchange material back to the silver cycle following which washing and silver halide forming steps are repeated.

EXAMPLE 1

A natural zeolite material (glauconite) was washed extensively with distilled water at a slow flow rate (24 cc./min.) with the column set up for downflow operation. The material had a rest bed volume BV (no flow) of 362 cc. and was contained in a cylindrical glass column 35 mm. inside diameter. The ion exchanger was then converted to the silver cycle by passing through it an aqueous solution of 0.3 N $AgNO_3$ at a slow flow to the Ag+ breakthrough, i. e., until a qualitative test with chloride ion at the base of the column showed silver ion. The column was then washed with water to a steady rate of loss of silver ion. The estimated capacity equalled .075 mole Ag+ or 0.2+ millimole per cc. of BV.

*Emulsion run.*—The column was conditioned for the run by passing through about 1000 cc. of a 1% gelatin solution at 40° C. Then 250 cc. (.075 mole) of 0.3 N ammonium bromide in 1% gelatin solution containing 0.024 mol percent of ammonium iodide per mol ammonium bromide was passed through at 40° C. at the slow flow rate. The effluent of the column was discarded until an opaque emulsion began to appear, the amount of this discard was approximately the void volume of the column (about 175 cc.). There was then obtained 210 cc. of opaque emulsion. At the time that the emulsion run effluent was exhausted, washing with 1% gelatin solution was started. Analysis show that the emulsion contained 0.0104 mole of AgBr.

The emulsion sample was made up to a 5% gelatin solution with dry gelatin and heated with a suitable sulfur sensitizer to give an emulsion which showed photographic sensitivity of motion-picture positive speed, and fog=.12.

EXAMPLE 2

A sulfonated phenol-formaldehyde type of cation exchange resin such as disclosed in U. S. 2,228,159 was washed in a column similar to that of Example 1 and converted to the H+ cycle and back to the K+ cycle by passing through solutions of dilute sulfuric acid, and potassium chloride. It was converted to the Ag+ cycle with 0.5 N $AgNO_3$ and washed as in Example 1 above.

*Emulsion run.*—With the column heated by a heat exchanger jacket to 51–52° C., a 0.4 N ammonium bromide solution in 2.5% gelatin was passed through without first preconditioning with gelatin solution which yielded after discarding 230 cc. of forerun, 400 cc. opaque emulsion. Analysis showed that this emulsion contained 0.0335 mole AgBr. To this emulsion there was added 15 cc. of M/2 silver nitrate solution and a suitable sulfur sensitizer.

This emulsion was then heated to give maximum speed and contrast.

EXAMPLE 3

In the previous example, the emulsion was prepared by means of downflow operation of the exchange unit. In the present example all operations are upflow methods. The exchange material of the previous example was removed and repacked in the column and was then washed with an upflow stream. Rest BV was 180 cc. After washing until a clear effluent was obtained (free of AgBr) with distilled water, the resin was converted to the Ag+ cycle, using 0.25 mole of silver as 0.5 N $AgNO_3$. The column was then washed as in Example 1 except by upflow.

*Emulsion run.*—A solution of 0.267 N ammonium bromide in 5% gelatin solution was passed through the column at 40° C. to give after rejection of 500 cc. of forerun, 165 cc. of opaque emulsion. Analysis showed 0.009 mole of AgBr.

EXAMPLE 4

A sulfonated phenol-formaldehyde resin type of cation exchange material (U. S. 2,204,539) in the potassium cycle was washed in the exchanger by upflow to pH 6.5 and there was passed through 2000 cc. of 0.5 N $AgNO_3$ adjusted to pH 7.5 with 3 N $NH_4OH$. The column was then washed to a steady rate of loss of silver. Rest $BV_{Ag}$=330 cc., expanded BV=380 cc.

*Emulsion run.*—On passing through 0.267 N ammonium bromide in 5% gelatin solution adjusted to neutrality, a rate of 120 cc./min., there resulted, after a discard of 1000 cc. of effluent, 1400 cc. of opaque emulsion. Analysis showed 0.14 mole of silver bromide. To the emulsion there was added a suitable sulfur sensitizer, and after digestion to optimum speed, the emulsion was coated on glass plates.

In the above examples cationic types of exchange materials were used. Experimental evidence to date indicates that while useful results can be obtained using anionic types of exchange materials of the acid absorbent type; e. g., the m-phenylenediaminepolyethylenediamine-formaldehyde type with absorbed halogen acid reacted with a soluble silver salt, or the newer quaternary ammonium halide type reacted with the silver salt, the efficiency of the processes is low and it is more difficult to obtain emulsions having the desired characteristics.

My invention having been described, I would have it understood that the disclosure herein is by way of example and that all modifications and equivalents falling within the scope of the appended claims are included in my invention.

I claim:

1. The method of making a photographic silver halide emulsion which comprises reacting a cation exchange material containing silver in the cation with an aqueous solution of a water-soluble halide selected from the group consisting of alkali metal, alkaline earth metal and ammonium halides in the presence of an organic peptizing agent for silver halide, thereby exchanging the cation of the halide for silver and forming a dispersion of silver halide in an aqueous solution of the peptizing agent which dispersion is separable from the so-modified exchange material, and separating said dispersion from the so-modified exchange material.

2. The method of making a photographic silver halide emulsion which comprises reacting an inorganic cation exchange material containing silver in the cation with an aqueous solution of a water-soluble halide selected from the group consisting of alkali metal, alkaline earth metal and ammonium halides in the presence of an organic peptizing agent for silver halide, thereby exchanging the cation of the halide for silver and forming a dispersion of silver halide in an aqueous solution of the peptizing agent which dispersion is separable from the so-modified exchange material, and separating said dispersion from the so-modified exchange material.

3. The method of making a photographic silver halide emulsion which comprises reacting a naturally occurring inorganic cation exchange material containing silver in the cation with an aqueous solution of a water-soluble halide selected from the group consisting of alkali metal, alkaline earth metal and ammonium halides in the presence of an organic peptizing agent for silver halide, thereby exchanging the cation of the halide for silver and forming a dispersion of silver halide in an aqueous solution of the peptizing agent which dispersion is separable from the so-modified exchange material, and separating said dispersion from the so-modified exchange material.

4. The method of making a photographic silver halide emulsion which comprises reacting a synthetic inorganic cation exchange material containing silver in the cation with an aqueous solution of a water-soluble halide selected from the group consisting of alkali metal, alkaline earth metal and ammonium halides in the presence of an organic peptizing agent for silver halide, thereby exchanging the cation of the halide for silver and forming a dispersion of silver halide in an aqueous solution of the peptizing agent which dispersion is separable from the so-modified exchange material, and separating said dispersion from the so-modified exchange material.

5. The method of making a photographic silver halide emulsion which comprises reacting an organic cation exchange material containing silver in the cation with an aqueous solution of a mixture of a halide selected from the group consisting of alkali metal, alkaline earth metal and ammonium halides in the presence of an organic peptizing agent for silver halide, thereby exchanging the cation of the halide for silver and forming a dispersion of silver halide in an aqueous solution of the peptizing agent which dispersion is separable from the so-modified exchange material, and separating said dispersion from the so-modified exchange material.

6. The method of making a photographic silver halide emulsion which comprises reacting a sulfonated carbonaceous cation exchange material containing silver in the cation with an aqueous solution of a halide selected from the group consisting of alkali metal, alkaline earth metal and ammonium halides in the presence of an organic peptizing agent for silver halide, thereby exchanging the cation of the halide for silver and forming a dispersion of silver halide in an aqueous solution of the peptizing agent which dispersion is separable from the so-modified exchange material, and separating said dispersion from the so-modified exchange material.

7. The method of making a photographic silver halide emulsion which comprises reacting a synthetic organic cation exchange material containing silver in the cation with an aqueous solution of a halide selected from the group consisting of alkali metal, alkaline earth metal and ammonium halides in the presence of an organic peptizing agent for silver halide, thereby exchanging the cation of the halide for silver and forming a dispersion of silver halide in an aqueous solution of the peptizing agent which dispersion is separable from the so-modified exchange material, and separating said dispersion from the so-modified exchange material.

8. The method of making a photographic silver halide emulsion which comprises reacting a sulfonated resinous cation exchange material containing silver in the cation with an aqueous solution of a halide selected from the group consisting of alkali metal, alkaline earth metal and ammonium halides in the presence of an organic peptizing agent for silver halide, thereby exchanging the cation of the halide for silver and forming a dispersion of silver halide in an aque- 9. The method of making a photographic silver halide emulsion which comprises reacting a sulfonated synthetic organic cation exchange material containing silver in the cation with an aqueous solution of a halide selected from the group consisting of alkali metal, alkaline earth metal and ammonium halides in the presence of an organic peptizing agent for silver halide, thereby exchanging the cation of the halide for silver and forming a dispersion of silver halide in an aqueous solution of the peptizing agent which dispersion is separable from the so-modified exchange material, and separating said dispersion from the so-modified exchange material.

10. The method of making a photographic silver halide emulsion which comprises washing a mixture of an inorganic cation exchange material containing silver in the cation and soluble silver salt until the amount of the silver salt in the effluent indicates that the loss of silver has reached a constant value, reacting the washed exchange material with an aqueous solution of a water-soluble halide selected from the group consisting of alkali metal, alkaline earth metal and ammonium halides in the presence of an organic peptizing agent for silver halide, thereby exchanging the cation of the halide for silver and forming a dispersion of silver halide in an aqueous solution of the peptizing agent which dispersion is separable from the so-modified exchange material, separating said dispersion from the so-modified exchange material, converting the so-modified exchange material back to the form having silver in the cation by reacting the so-modified exchange material with an aqueous solution containing the soluble silver salt of said effluent, washing the resulting exchange material to said extent and reacting it with said soluble halide in the presence of said peptizing agent thereby providing a second dispersion of silver halide separated from the exchange material.

11. The method of making a photographic silver halide emulsion which comprises washing a mixture of an organic cation exchange material containing silver in the cation and soluble silver salt until the amount of the silver salt in the effluent indicates that the loss of silver has reached a constant value, reacting the washed exchange material with an aqueous solution of a water-soluble halide selected from the group consisting of alkali metal, alkaline earth metal and ammonium halides in the presence of an organic peptizing agent for silver halide, thereby exchanging the cation of the halide for silver and forming a dispersion of silver halide in an aqueous solution of the peptizing agent which dispersion is separable from the so-modified exchange material, separating said dispersion from the so-modified exchange material, converting the so-modified exchange material back to the form having silver in the cation by reacting the so-modified exchange material with an aqueous solution containing the soluble silver salt of said effluent, washing the resulting exchange material to said extent and reacting it with said soluble halide in the presence of said peptizing agent thereby providing a second dispersion of silver halide separated from the exchange material.

12. The method of making a photographic silver halide emulsion which comprises reacting a cation exchange material containing silver in the cation with an aqueous solution of a water-soluble halide selected from the group consisting of alkali metal, alkaline earth metal, and ammonium halides, thereby forming silver halide by exchanging the cation of the halide for silver and regenerating the exchange material to the form free of silver in the cation, subjecting said silver halide to the action of an organic peptizing agent for silver halide to render the silver halide separable from the regenerated exchange material, and separating the silver halide and peptizing agent simultaneously from the regenerated exchange material.

References Cited in the file of this patent

UNITED STATES PATENTS

| Number | Name | Date |
| --- | --- | --- |
| 1,844,716 | Lambert | Feb. 9, 1932 |
| 2,066,271 | Irwin | Dec. 29, 1936 |
| 2,452,179 | Bunting | Oct. 26, 1948 |
| 2,497,054 | Day | Feb. 7, 1950 |
| 2,525,247 | Thurston | Oct. 10, 1950 |

OTHER REFERENCES

Mees, The Theory of the Photographic Process, pp. 16 and 17. Pub. The MacMillan Co., New York, N. Y. (1942).